United States Patent [19]
Hsu

[11] Patent Number: 5,699,602
[45] Date of Patent: Dec. 23, 1997

[54] APPARATUS FOR ADJUSTING POSITION OF A MACHINING UNIT ON A CHIP CARRIER MAKER

[75] Inventor: Hua-Shan Hsu, Taipei, Taiwan

[73] Assignee: Smooth Ocean Enterprise Co., Ltd., Taipei, Taiwan

[21] Appl. No.: 676,038

[22] Filed: Jul. 5, 1996

[51] Int. Cl.⁶ .................................................. B21B 15/00
[52] U.S. Cl. .................... 29/335; 29/33 Q; 72/447; 83/249; 83/948; 269/73; 437/206
[58] Field of Search .................. 72/446, 447, 455; 29/564, 54, 742, 25.01, 33 M, 33 Q, 335, 824; 437/206, 207, 220; 83/948, 249; 269/73

[56] References Cited

U.S. PATENT DOCUMENTS

| | | | |
|---|---|---|---|
| 4,577,845 | 3/1986 | Kimura et al. | 269/73 |
| 4,652,095 | 3/1987 | Mauro | 269/73 |
| 4,766,465 | 8/1988 | Takahashi | 269/73 |
| 5,061,039 | 10/1991 | Cassidy | 269/73 |
| 5,113,565 | 5/1992 | Cipolla et al. | 29/25.01 |
| 5,207,115 | 5/1993 | Takei | 269/73 |
| 5,410,904 | 5/1995 | Hirata et al. | 72/446 |
| 5,423,524 | 6/1995 | Searle | 269/71 |
| 5,461,978 | 10/1995 | Chou | 101/248 |
| 5,513,792 | 5/1996 | Onitsuka | 29/33 M |
| 5,526,668 | 6/1996 | Futamura et al. | 29/33 Q |
| 5,575,058 | 11/1996 | Nakamura et al. | 29/33 M |

FOREIGN PATENT DOCUMENTS

58-202544  11/1983  Japan ............................. 29/25.01

*Primary Examiner*—Daniel W. Howell
*Assistant Examiner*—Christopher Kirkman
*Attorney, Agent, or Firm*—Finnegan, Henderson, Farabow, Garrett & Dunner

[57] ABSTRACT

An apparatus adjusts the position of a machining unit on a chip carrier maker. The machining unit machines a tape consisting of a row of interconnected chip carriers which are integrally formed with each other. The maker includes a stationary machine frame. The apparatus includes a longitudinal adjustment unit being capable of moving the machining unit in a direction parallel to the tape, and a transverse adjustment unit being capable of moving the machining unit in a direction perpendicular to the tape. The apparatus further includes two parallel sliding rails fixed on the machine frame and extending in a direction parallel to the tape, and a receiving seat mounted slidably on the sliding rails so as to guide the receiving seat to slide along the sliding rails when the longitudinal adjustment unit is actuated. The receiving seat has a top surface formed with a slide slot which extends in a direction perpendicular to the tape and which receives slidably the machining unit so as to guide the machining unit to slide along the slide slot when the transverse adjustment unit is actuated.

4 Claims, 8 Drawing Sheets

APPARATUS FOR ADUSTING POSITION OF A MACHINING UNIT ON A CHIP CARRIER MAKER

BACKGROUND OF THE INVENTION

Field of the Invention

This invention relates to a chip carrier maker, more particularly to an apparatus for adjusting position of a machining unit on a chip carrier maker.

A chip carrier maker is designed to make a row of interconnected chip carriers shown in FIG. 1, which are integrally formed with each other to form a tape 1. Each of the chip carriers has a square recess 11 for accommodating a chip (not shown) therein, and several holes 12.

Referring to FIG. 2, in a conventional chip carrier maker, a tape 21 is fed from a tape supply unit 22 and is then machined in several machining units including a heating unit 23 for heating the tape 21, a press unit 24 for pressing the tape 21 to form recesses therein, and a punching unit 25 for punching the tape 21 to form holes therethrough. Subsequently, the tape 21 is moved by a gripping unit 26 to a winding unit 27 in which the tape 21 is wound.

Each of the machining units 23, 24, and 25 is equipped with an apparatus for adjusting the position of the machining unit on the chip carrier maker. As shown in FIG. 3, the heating unit 23 has a base 31 which is disposed on a stationary machine frame 28 and which includes a movable support plate 311 and a fixed support plate 312 which are coupled together by a transverse adjustment unit 32. Actuation of the transverse adjustment unit 32 can move the movable support plate 311 relative to the fixed support plate 312 in a direction perpendicular to the tape. The heating elements are carried on the movable support plate 311. On one side of the fixed support plate 312, a longitudinal adjustment unit 33 and two adjustment bolts 34 (see FIG. 4) are provided. The adjustment bolts 34 are threaded to the fixed support plate 312. FIG. 4 is a top view of the longitudinal adjustment unit. FIG. 5 is a side view of the longitudinal adjustment unit 33. As shown in FIGS. 4 and 5, the longitudinal adjustment unit 33 includes two lock bolts 331 locking the base 31 on the machine frame 28, and a vernier caliper 332. Upon loosening the lock bolts 331, the base 31 can be moved by the hands of the user on the machine frame in a direction parallel to the tape. Rotation of the vernier caliper 332 on the machine frame 28 moves accurately the base 31 in a direction parallel to the tape. Because no guide device is provided to guide the support plates 311 and 312 to move, it is necessary to adjust and press one of the adjustment bolts 34 against the fixed support plate 312 after transverse and/or longitudinal position adjustment of the support plates 311 and 312, thereby inconveniencing the user.

SUMMARY OF THE INVENTION

An object of this invention is to provide an apparatus for easily adjusting the position of a machining unit on a chip carrier maker.

According to this invention, an apparatus adjusts the position of a machining unit on a chip carrier maker. The machining unit machines a tape consisting of a row of interconnected chip carriers which are integrally formed with each other. The maker includes a stationary machine frame. The apparatus includes a longitudinal adjustment unit being capable of moving the machining unit in a direction parallel to the tape, and a transverse adjustment unit being capable of moving the machining unit in a direction perpendicular to the tape. The apparatus further includes two parallel sliding rails fixed on the machine frame and extending in a direction parallel to the tape, and a receiving seat mounted slidably on the sliding rails so as to guide the receiving seat to slide along the sliding rails when the longitudinal adjustment unit is actuated. The receiving seat has a top surface formed with a slide slot which extends in a direction perpendicular to the tape and which receives slidably the machining unit so as to guide the machining unit to slide along the slide slot when the transverse adjustment unit is actuated.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
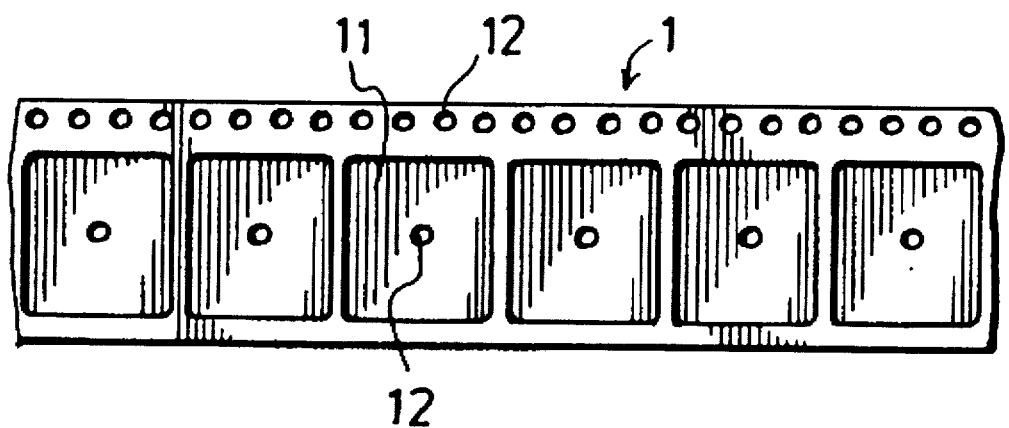
FIG. 1 shows a tape consisting of a row of interconnected chip carriers.
Figure 2:
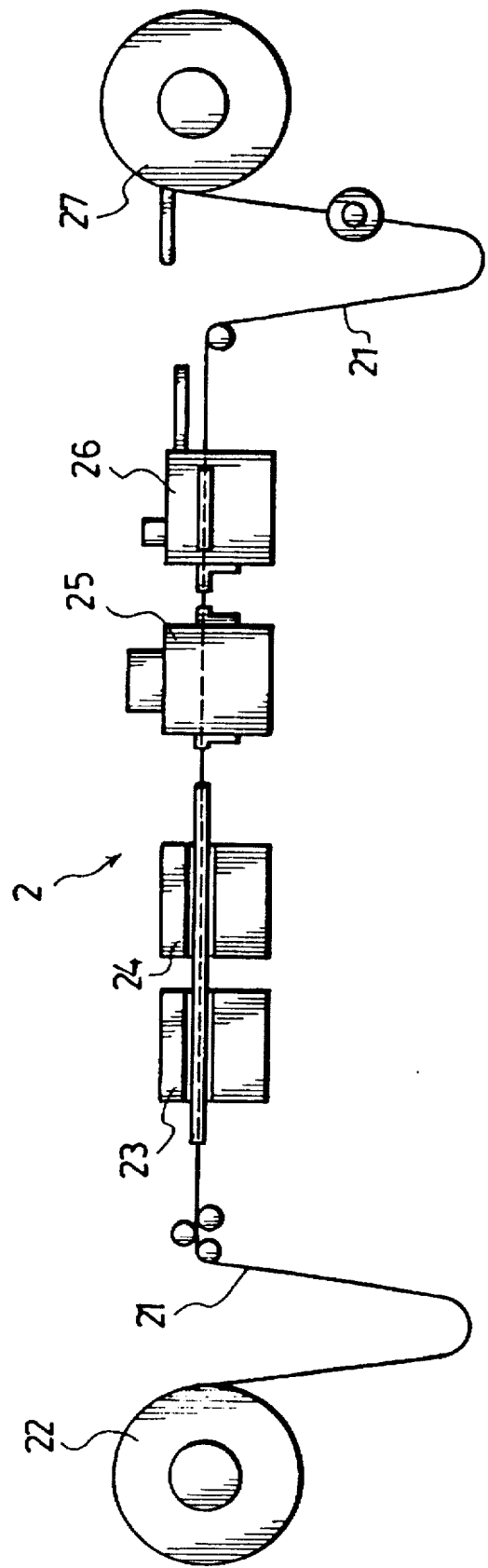
FIG. 2 illustrates how a tape is treated in a chip carrier maker.
Figure 3:
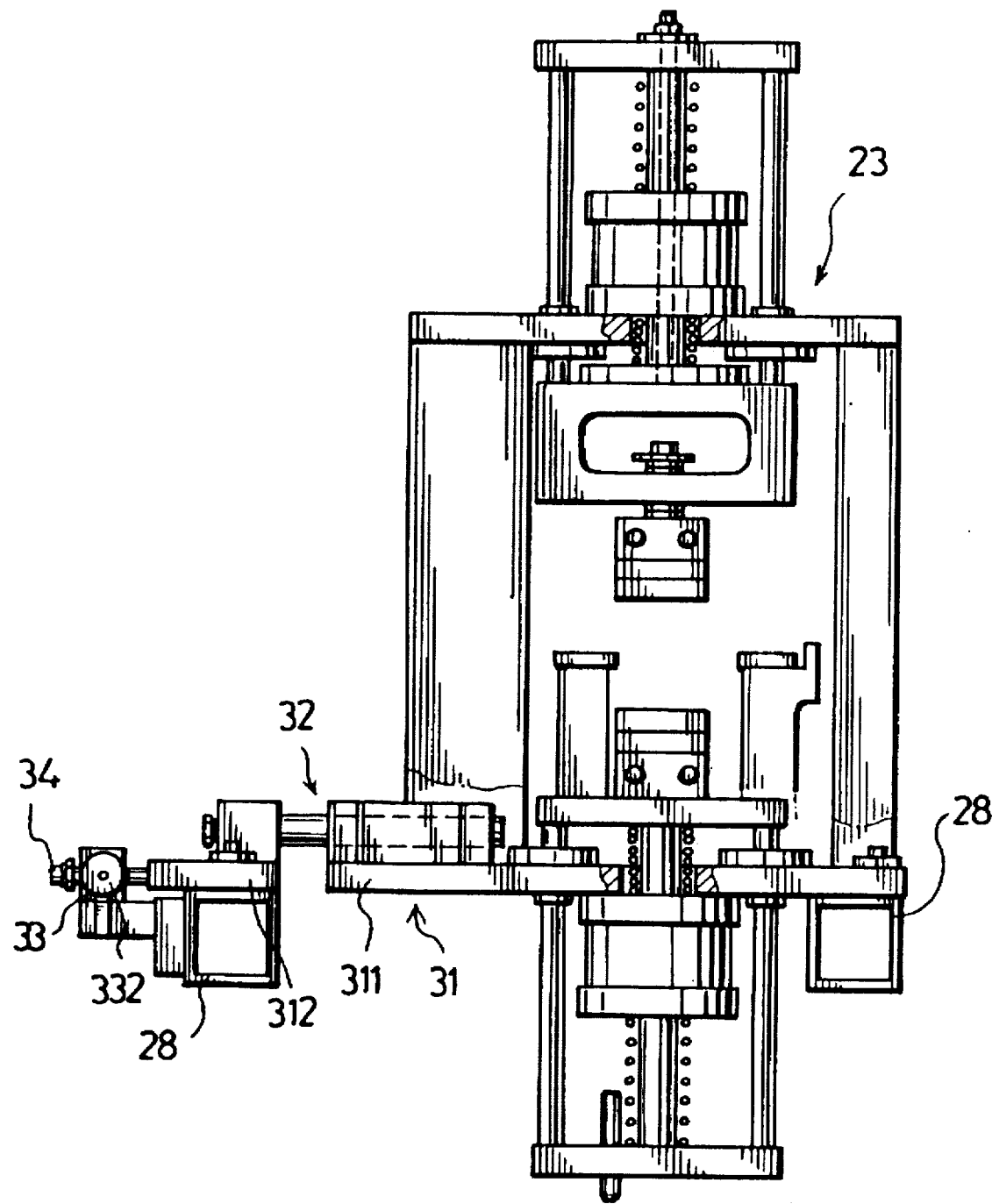
FIG. 3 illustrates a conventional heating unit for a chip carrier maker.
Figure 4:
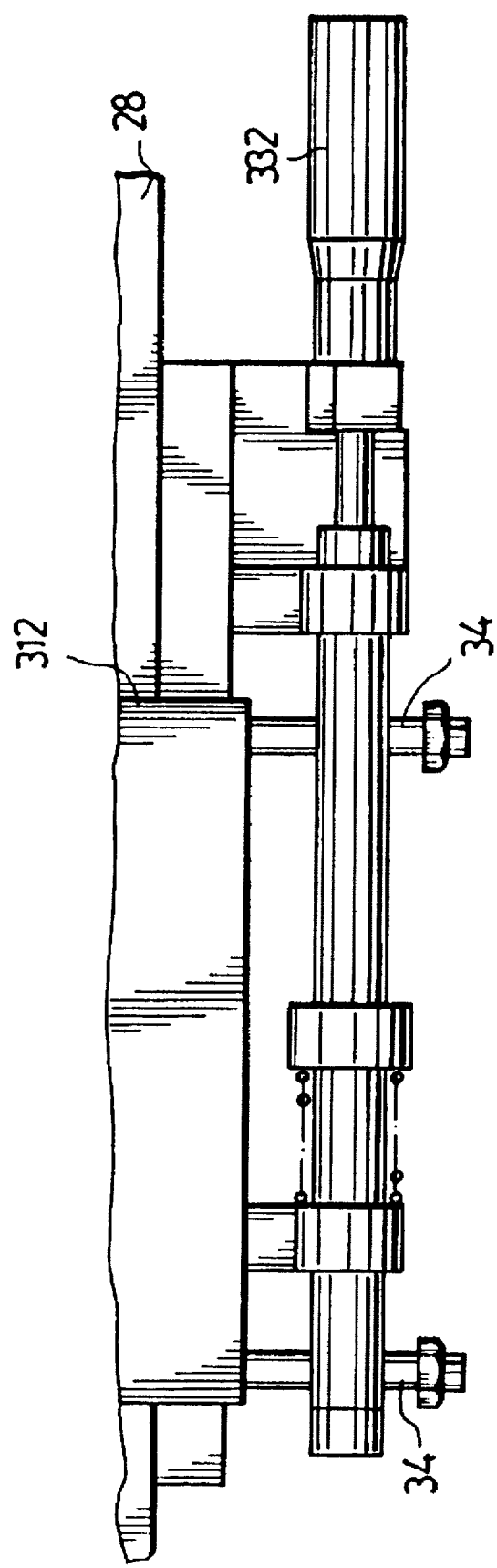
FIG. 4 is a top view showing the longitudinal adjustment unit of the conventional heating unit.
Figure 5:
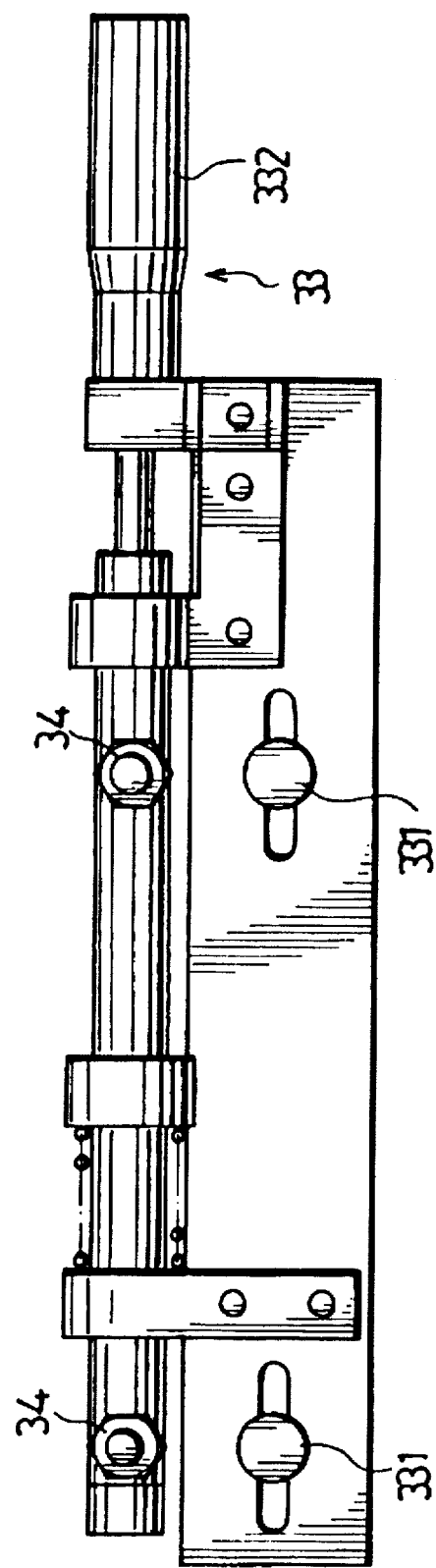
FIG. 5 is a side view showing the longitudinal adjustment unit of the conventional heating unit.
Figure 6:
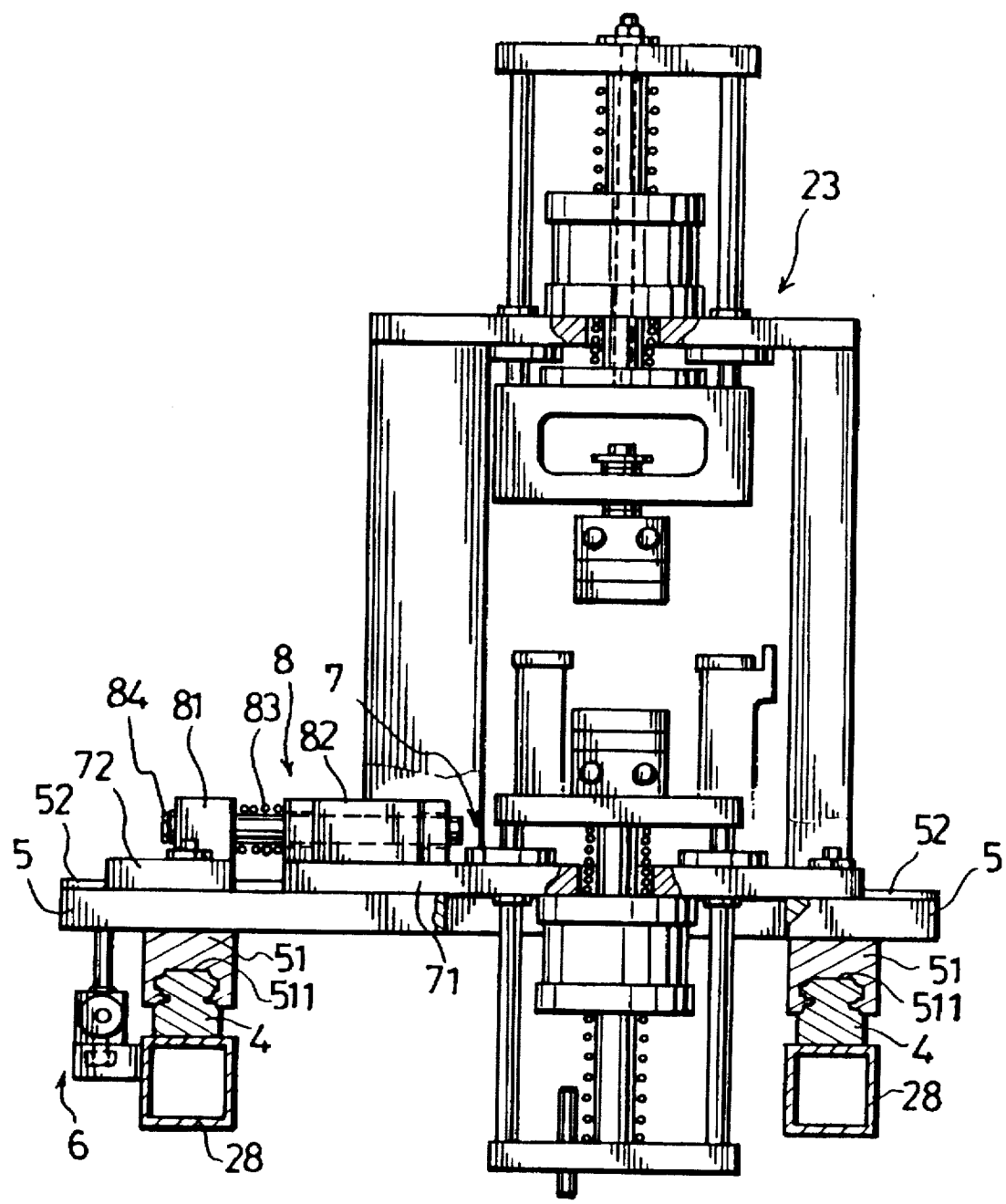
FIG. 6 illustrates an apparatus for adjusting position of a machining unit on a chip carrier maker according to this invention.
Figure 7:
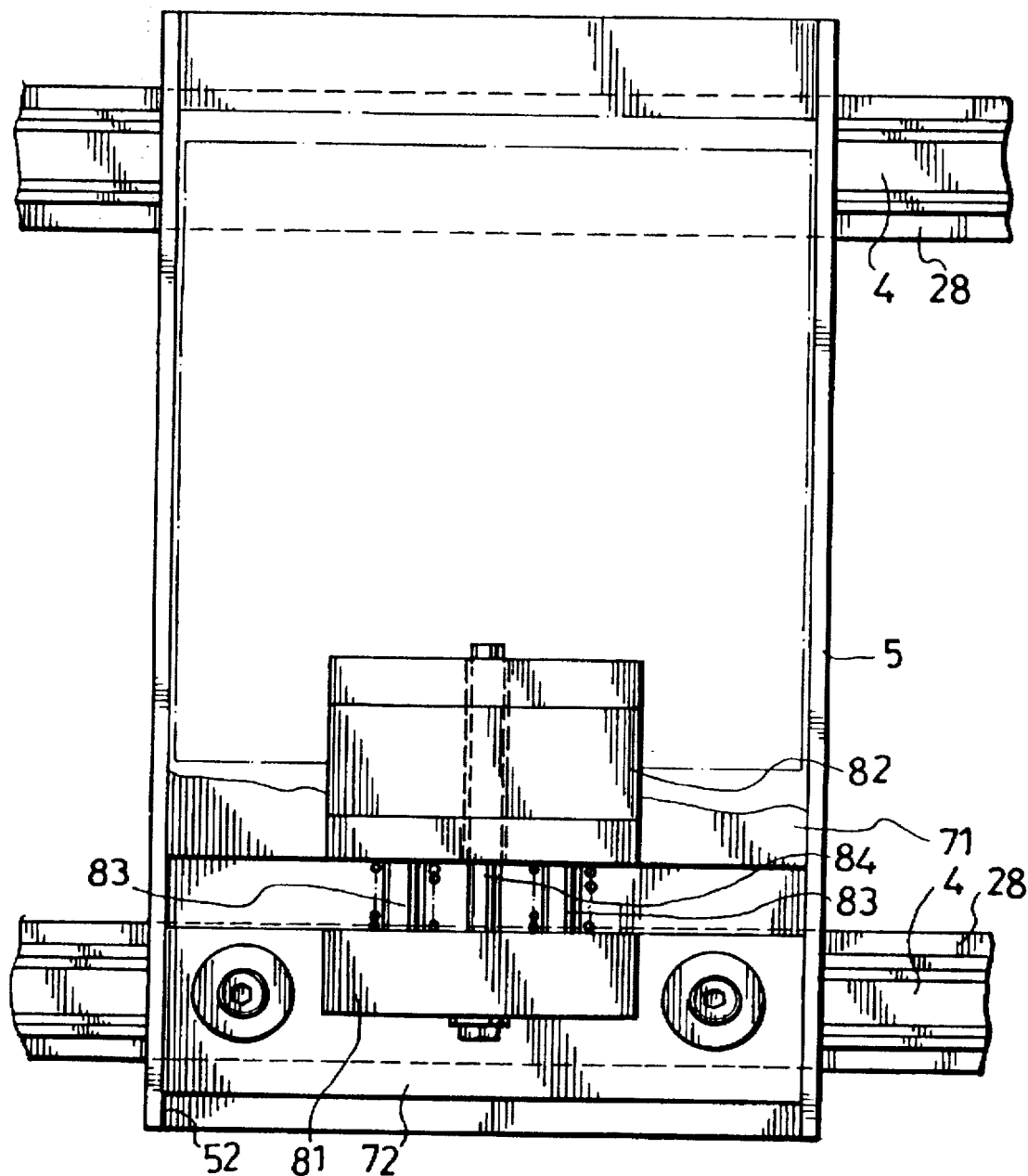
FIG. 7 illustrates a transverse adjustment unit of the apparatus of this invention.

Referring to FIGS. 6 and 7, an apparatus for adjusting position of a machining unit on a chip carrier maker according to this invention includes two parallel sliding rails 4 fixed on the machine frame 28 and extending in a direction parallel to the tape (see FIG. 1). A receiving seat 5 has an underside provided with two fixed sliding blocks 51 which are formed with slide slots 511 engaged slidably with the sliding rails 4, so as to guide the receiving seat 5 to slide along the sliding rails 4 when a longitudinal adjustment unit 6 is actuated. A base 7 includes a movable support plate 71 disposed slidably within the slide slot 52 in the top surface of the receiving seat 5 and carrying the machining unit on the movable support plate 71, and a fixed support plate 72 fixed on the receiving seat 5. The slide slot 52 of the receiving seat 5 extends in a direction perpendicular to the tape (see FIG. 1) and receives slidably the movable support plate 71 so as to guide the movable support plate 71 to slide along the slide slot 52 when a transverse adjustment unit 8 is actuated.

The transverse adjustment unit 8 includes a first fixing block 81 fixed on the fixed support plate 72, a second fixing block 82 fixed on the movable support plate 71 and having a threaded hole formed through the second fixing block 82, two parallel spring-sleeved guide rods 83 extending through the first and second fixing blocks 81 and 82, and an adjustment bolt 84 journalled on the fixed support plate 72 and extending threadedly through the threaded hole of the movable support plate 71, so that rotation of the adjustment bolt 84 on the fixed support plate 72 can move the movable support plate 71 and the machining unit along the slide slot 52 of the receiving seat 5.

Figure 8:
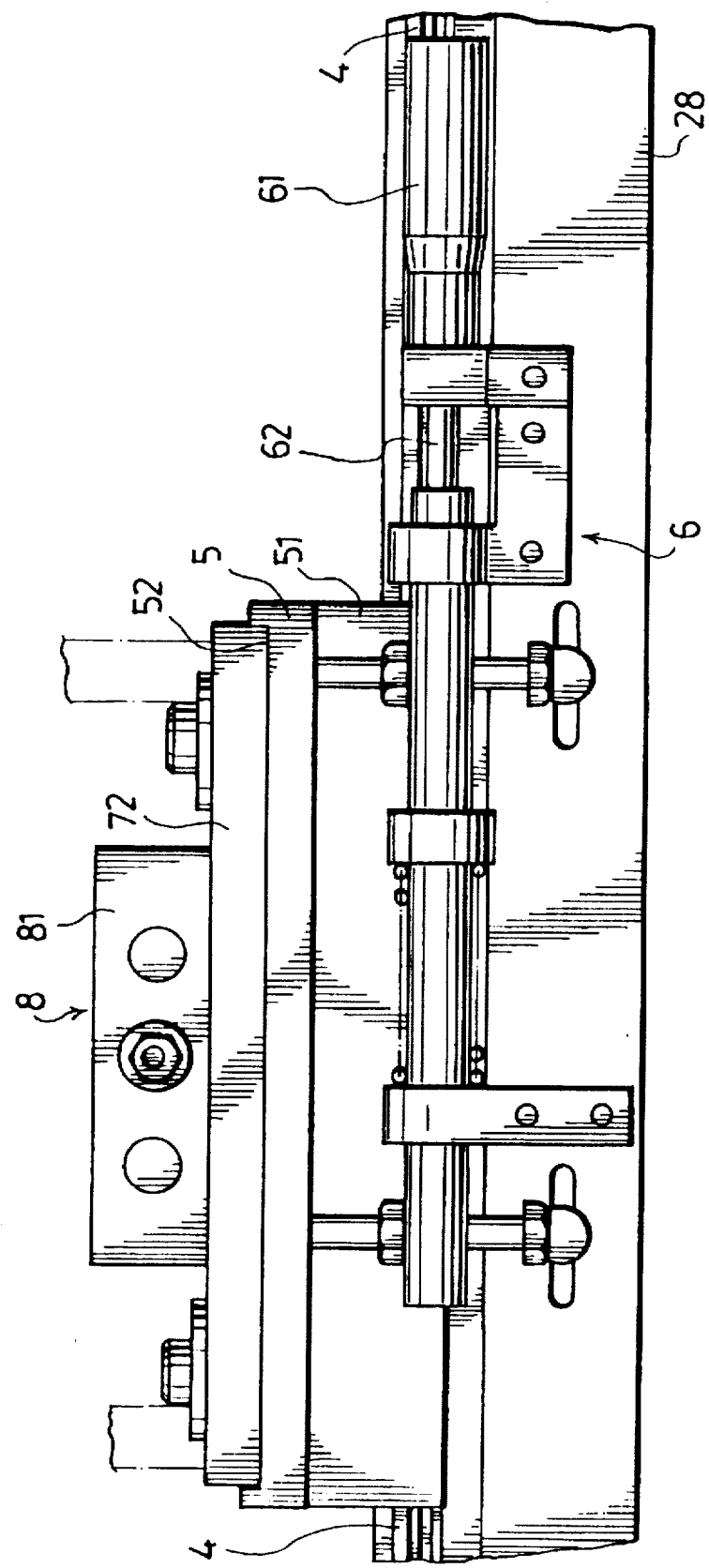
FIG. 8 illustrates a longitudinal adjustment unit of the apparatus of this invention.

Referring to FIG. 8, the longitudinal adjustment unit 6 includes a vernier caliper 61 mounted operatively on the machine frame 28 and coupled with the receiving seat 5. Upon rotation of the vernier caliper 61 on the machine frame 28, the driving shaft 62 of the vernier caliper 61 can move accurately the receiving seat 5 along the sliding rails 4.

With this invention thus explained, it is apparent that numerous modifications and variations can be made without departing from the scope and spirit of this invention. It is therefore intended that this invention be limited only as indicated in the appended claims.

I claim:

1. In a device for adjusting the position of a machining unit on a chip carrier making apparatus, the machining unit machining a tape consisting of a row of interconnected chip carriers which are integrally formed with each other, the apparatus including a stationary machine frame, and the device including a longitudinal adjustment unit capable of moving the machining unit in a direction parallel to the tape, and a transverse adjustment unit capable of moving the machining unit in a direction perpendicular to the tape, the improvement wherein said device comprises:

two parallel sliding rails fixed on the machine frame and extending in a direction parallel to the tape; and a receiving seat mounted slidably on said sliding rails so as to guide said receiving seat to slide along the sliding rails when the longitudinal adjustment unit is actuated, said receiving seat having a top surface formed with a slide slot which extends in a direction perpendicular to the tape and which receives slidably the machining unit so as to guide the machining unit to slide along the slide slot when the transverse adjustment unit is actuated;

wherein said transverse adjustment unit includes:

a movable support plate disposed slidably within said slide slot of said receiving seat and carrying the machining unit on said movable support plate;

a fixed support plate fixed on said receiving seat;

a first fixing block fixed on said fixed support plate;

a second fixing block fixed on said movable support plate and having a threaded hole formed through said second fixing block;

two parallel guide rods extending through said first and second fixing blocks;

two coiled compression springs respectively sleeved on said guide rods between said first and second fixing blocks; and an adjustment bolt journalled on said fixed support plate and extending threadedly through said threaded hole of said second fixing block so that rotation of said adjustment bolt on said fixed support plate will move said movable support plate and said machining unit along said slide slot of said receiving seat.

2. The device of claim 1, wherein said longitudinal adjustment unit includes a vernier caliper mounted operatively on said machine frame and coupled with said receiving seat, rotation of said vernier caliper on said machine frame moving said receiving seat along said sliding rails.

3. The device of claim 1, wherein said receiving seat has an underside provided with two fixed sliding blocks which are respectively and slidably mounted on said sliding rails.

4. The device of claim 1, wherein the adjustment bolt is journalled in said first fixing block fixed on said fixed support plate.

* * * * *